United States Patent Office 2,697,255
Patented Dec. 21, 1954

2,697,255

METHOD FOR PRODUCING CELLULAR THERMOPLASTIC BODIES

Herbert Lindemann, Sins, Switzerland

No Drawing. Application January 9, 1952,
Serial No. 265,729

Claims priority, application Switzerland January 11, 1951

8 Claims. (Cl. 18—48)

The present invention relates to a method for producing cellular thermoplastic bodies having a great number of cells and having a relatively high specific gravity.

It is an object of the present invention to provide a process for producing cellular thermoplastic bodies having a stable shape and form and having a relatively high specific gravity.

It is a further object of the present invention to provide a process for preparing cellular thermoplastic bodies wherein a major portion of the gas is removed from the gas-containing cells in said thermoplastic body thereby forming a thermoplastic body which has a stable shape and form and which upon standing does not appreciably change its shape or form.

It is a still further object of the present invention to provide a process for removing by diffusion through the walls of the closed cells a major portion of the gas from the gas-containing cells of a cellular thermoplastic body thereby contracting the thermoplastic body and increasing the specific gravity thereof thus forming a stable thermoplastic body.

It is another object of the present invention to produce cellular thermoplastic articles having a relatively high specific gravity and having a definite number of cells in relation to the specific gravity, and which upon standing for long periods of time retain their shape and form.

With the above objects in view the present invention mainly consists in heating a cellular thermoplastic body, preferably after it has been cut into relatively thin slices, so as to cause a portion of the gas to escape by diffusion through the walls of the closed cells from the gas-containing cells in said thermoplastic body, thereby causing said thermoplastic body or slices of the same to contract so as to reduce its total volume and consequently increase the specific gravity thereof, thus obtaining a thermoplastic body having a great number of closed cells and having a relatively high specific gravity as compared to the specific gravity of the original thermoplastic body.

It is a preferred embodiment of the present invention that the original thermoplastic body be prepared so as to be relatively thick so that this cellular body will have a great number of gas-containing cells, and that the cellular body be sliced into relatively thin slices of the same before being heated to remove a portion of the gas in said cellular body. It is preferable in any event to remove the outer surface or crust from the cellular body, i. e. by shaving it off so as to cut through and expose a great number of cells on the newly formed surface of said cellular body, thereby facilitating the escape of gas by diffusion from the cellualr body in the later heating step.

It is another preferred embodiment of the present invention that the cellular thermoplastic body be heated to below the softening point of the particular thermoplastic body. The temperatures at which a thermoplastic body will soften depends upon the particular resin or resins from which the body is derived. By simple pre-testing or by standard tables it is easy to determine the softening point of the particular thermoplastic resin from which the thermoplastic body is made. It is further preferable that the thermoplastic body or slices of thermoplastic body be heated under reduced pressure and most preferably under partial vacuum so as to facilitate the escape of the gas from the gas-containing cells in said thermoplastic body into the surrounding atmosphere.

The original cellular body may be prepared by any of the common known methods and the gas contained in the cells of the thermoplastic body may be any of the common gases used to form such cellular body, i. e. nitrogen, carbon dioxide, etc. It has been found most preferable for the purpose of the present invention and for other purposes as explained in my co-pending application Serial No. 246,868, filed on September 15, 1951, to include a light, quick-diffusing gas such as hydrogen in the preparation of the original cellular body. Such light, quick-diffusing gas escapes much more easily from the gas-containing cells, and in fact a large portion of this gas escapes from the cells and from the thermoplastic body even before said body is treated according to the process of the present invention.

The present invention is particularly applicable to cellular thermoplastic bodies made from polyvinyl chloride, with or without the addition of a plasticizer. The cellular thermoplastic body may be made by including a blowing agent in the original mass or by applying a gas such as nitrogen from without the mass in order to occlude gas within the mass thereby forming a cellular body.

The method of the invention may be applied to other thermoplastic materials besides polyvinyl chloride such as copolymers of vinyl chloride containing a major portion of copolymerized vinyl chloride, mixtures of polyvinyl chloride with other thermoplastic resins, polyvinyl butyrate, polyvinyl acetate, polyvinyl alcohol, polyvinyl acetals such as polyvinyl formal, polyvinyl butyral, etc., polyvinylidene chloride, copolymers of vinylidene chloride and vinyl chloride, polyvinyl aromatic compounds such as polystyrene, polydichlorostyrene, polyalphamethylstyrene, etc., and acrylic compounds such as polymethylacrylate, polyethyl acrylate, polymethylmethacrylate, etc. The thermoplastic resins may be used with or without plasticizers.

As illustrative of the plasticizers that may be used are the following: dioctylphthalate, dibutylphthalate, dimethylphthalate, tricresyl phosphate, etc. Any of these plasticizers or mixtures of them may be employed with the process.

An excellent blowing agent which may be used in this process is azisobutyric dinitrile. Other nitrogen-producing blowing agents which may be used are alpha, alpha'-azobisisobutyronitrile, diazoaminobenzene, 1,3-bis(o-xenyl)-triazene, 1,3-bis (p-xyenl) triazene, etc. Nitrogen-producing blowing gases are preferred, however, blowing agents which produce other gases such as ammonium or carbon dioxide may be employed. Commonly used blowing agents which produce these gases are sodium bicarbonate and oleic acid, ammonium carbonate, mixtures of ammonium chloride and sodium nitrite, etc.

The cellular thermoplastic body formed by any of the normal processes will have a relatively low specific gravity commonly varying between 0.03 and 0.15. The process of the present invention by causing a portion of the gas in the gas-containing cells to escape from the thermoplastic body, causes the body to contract, thus increasing the specific gravity thereof. The present process is highly advantageous in that it increases the specific gravity of the thermoplastic body while retaining the closed cell cellular structure therein. Although the cells decrease in size because of having a portion of the air removed therefrom, the cellular structure remains in the thermoplastic body, thereby giving the body the advantages of a closed cell cellular structure, with the additional advantages of stable, tension-free form and higher mechanical properties.

The process of the present invention increases the specific gravity of the cellular thermoplastic body from the original relatively low specific body of 0.03 to 0.15 to a relatively high specific gravity of 0.2 to 0.9. The heating which causes the escape of gas from the gas-containing cells is preferably carried out until the specific gravity of the thermoplastic body has been raised to about 0.5 to 0.7. It has been found that cellular thermoplastic bodies having such specific gravity have the best over-all properties of cellular structure and stable, tension-free form.

The time of heating in order to result in the desired specific gravity will vary depending upon the initial specific gravity, the type of thermoplastic, the use of a plasticizer and/or solvent in preparing the original cellular thermoplastic body, the pressure, etc. This time of heating may vary from 1–10 hours, though not limited to these times, depending upon the different variables and the desired result.

The cellular thermoplastic bodies are preferably cut into slices of less than 30 mm. thickness before being heated so as to cause the gas to escape from the gas-containing cells therein. It has been found most preferable that the slices be between 2 and 20 mm. This slicing facilitates the removal of the gas from within the body and further causes the outer surface to be very smooth after the gas has been removed from the body. The process of the present invention causes the entire body to contract by causing the gas contained in the cells in said body to escape. The cells contract and therefore the body surrounding the cells contracts. The final cellular body from which a portion of the gas has been removed according to the process of the present invention will still be cellular, the cells however being much smaller in size than the original cells, and the surface of the final cellular body will have about 600–5000 cells per cm.$^2$ on said surface.

The heating of the cellular bodies to cause a portion of the gas to escape from the gas-containing cells therein may be carried out immediately after the original cellular body is prepared, while said cellular body is still warm from the original preparation thereof, or the cellular body may be allowed to stand for a period of time so as to cause a portion of the gas to escape at room temperature into the atmosphere. In either event the cellular body is then heated so as to cause the desired amount of gas to escape from the cells therein, thereby increasing the specific gravity to the desired degree, normally at least double the original specific gravity thereof. Flat, sheet-like bodies, the specific gravity of which have been increased according to the process of the present invention find useful application in industry, for example as shoe soles, etc. Shoe soles made from thus treated thermoplastic bodies have the advantage of being resilient while being tension-free and having a high tensile strength.

Cellular materials have hitherto been prepared from rubber which have been cut into sheets, foils etc., and been used for the making of various objects. These objects have a very pleasant appearance in that the fine cut cells on the surface of the objects have a velvet-like appearance and feel. They are soft, elastic and have good insulating properties. However, such cellular rubber bodies have the fault of having a very low tensile strength, particularly in the case of thin foils with low specific gravity. Furthermore they are not temperature resistant, they have the characteristic rubber odor and are therefore not useful for many purposes. Furthermore they cannot be prepared in light colors—particularly white.

Although cellular bodies have been prepared from thermoplastic plastics, they can't be used for similar products as cellular rubber inasmuch as the processes for the preparation of cellular rubber bodies cannot be used for the preparation of thermoplastic cellular bodies. Thermoplastic artificial cellular bodies have, especially in the cell walls, because of the process for preparing the cellular bodies, a definite tension which causes a shrinking or contracting phenomenon of the cellular body. This is apparently due to the fact that the expansion of the larger bodies is to a large extent carried out at temperatures which are under the yield point of the thermoplastic. The cell walls are therefore formed at temperatures at which the material is still elastic, at which temperature the cells are blown up and formed, therefore giving to these cells a permanent resistance. Thus formed cellular bodies, in such tensioned condition not only shrink and contract but furthermore in many instances completely alter the original form thereof. This is particularly so in the case of thermoplastic cellular bodies having a large amount of plasticizer contained therein. In the case of cellular rubber bodies this tensioned condition is removed by a final vulcanization step which stabilizes the form of the cell walls and thereby makes the cellular body tension-free.

Such final vulcanization step cannot be used with artificial thermoplastic masses such as polyvinyl chloride. During storage of such cellular bodies or by the cutting of sheets from these bodies, some of the gas contained in the cells slowly diffuses out of the bodies causing the cell bodies to shrink together until the tension in the walls of the cell bodies has been equalized with the pressure within the cells. This shrinking or contracting process takes a long time; it may take months or even years, so that this cannot be used as a means for arriving at a stabilized form. If such unstabilized sheets or foils are glued together, or, with another substance in order to strengthen them, it is found that after a short time, because of the contracting of the cell walls, the edges of the sheet curl and therefore such sheets are useless because of the lack of a stable form.

The present invention removes all of the above enumerated difficulties in the cases of plasticizer-containing or plasticizer-free artificial thermoplastic flat sheet-like cellular bodies. The process of the present invention contracts the cellular bodies, thereby stabilizing the form thereof, by heating such cellular bodies, preferably slices of larger cellular bodies, at such high temperature and for such periods of time that at least a portion of the gas contained in the cells of said cellular bodies diffuses out and escapes from the closed cells thereby shrinking the body and increasing the specific gravity thereof.

The original cellular bodies are cut or sliced into sheets preferably of up to 30 mm. thickness, because the thinner the slice of cellular body the easier it is for the gas to diffuse out of the cells. It is only by this diffusing-out of the gas in the cells in said cellular body that a considerable contracting of the body can take place. The higher the temperature and the thinner the cellular body, the faster the gas escapes therefrom. Of course the temperature at which the cellular body is treated according to the process of the present invention is not so high as to cause the structure of the cellular body to become deformed or adversely affected.

It is moreover essential and particularly favorable that the cellular bodies be originally prepared so that they are sufficiently strong and sufficiently thick to be cut into thin slices, upon which thin slices the process of the present invention is carried out. These thin slices are of course thicker than the final product. The cut pieces of cellular thermoplastic, through the application of heat which causes the gas contained in the cells of the thermoplastic body to diffuse out of the cells, shrink after a short period of heating, i. e., one to two hours or even less, to a contracted practically tension-free condition. By regulating or varying the contracting process it is possible to give to the final product greater or lesser properties of strength and resiliency. It is further possible to determine in advance the specific gravity of the final product. The final product is further characterized by the texture of the surface and has a definite proportion of the number of cells on the surface to the specific gravity thereof.

For example, if highly blown up cellular bodies from polyvinylchloride containing about 35% plasticizer and having a specific gravity of 0.1–0.15 is cut into slices having a thickness of about 4–20 mm., preferably 6–12 mm. and treated for 4 to 12 hours at temperatures of about 100° C. so as to contract the slices linearly about 40%, the resulting cellular body has a specific gravity of about 0.3 to 0.8, preferably 0.5 to 0.6 and on the cut surface has about 600 to 1200 per cm.$^2$, preferably 900 to 1000, has about cells being cut by slicing. Such product has a very fine cellular structure and though fairly solid is still somewhat elastic and resilient. Such cellular bodies are very useful as shoe soles.

If a highly blown up polyvinylchloride cellular body, containing about 45% plasticizer and having a specific gravity of about 0.03 to 0.05 is cut into thin slices about 1 to 8 mm. thick, preferably 2 to 4 mm., and is treated at temperatures of 70 to 100° C. for about 1 to 2 hours, so as to contract the cellular body, the resulting cellular body has a specific gravity of 0.1 to 0.5, preferably 0.15 to 0.3, and the cut surface has about 700 to 1000 cut cells per cm.$^2$, preferably 800 to 900 cells. Such final product has a very smooth, finely porous, velvet-like surface and may be used for soft lining or insulation material for which no particular elasticity or strength is required.

A very pretty deer leather-like product results from a cellular body which has been strongly contracted so as to have a specific gravity of 0.15 to 0.25 and has about 900 to 1300 open cells per cm.$^2$ in the surface thereof.

It is also possible to contract the cellular body according to the process of the present invention so as to result in a final cellular body which has a specific gravity of 0.2 to 0.3 and has about 2000 to 5000 cut cells per cm.² in the cut surface thereof.

The cellular structure of such final products cannot be determined by the naked eye. The products have a practically smooth surface and are more compact the greater the contracting of the original cell bodies. These structures may be used for the making of top leather, substitute for skins, as mantal coverings, etc. These products may be strengthened by the use of a textile lining connected to the cellular body.

More or less soft, flat sheets can be made into hard and stiff sheets by contracting according to the process of the present invention, cellular bodies which are made with a highly volatile solvent as softening agent or plasticizer. The cutting of such cellular bodies into thin slices not only facilitates the diffusion-out of the gases contained therein but also allows for the escape of the highly volatile solvent. The solvent can be caused to escape simultaneously with the diffusion-out of the gases contained in the cells of the cellular body. It is possible to first allow a portion of the gas to escape at customary temperatures and then to further warm the cellular body so as to cause the escape of the solvent contained therein.

The contracting of the cellular body through the driving-off of the gas contained therein can be carried out in various manners. In any event the driving-off of the gas causes a corresponding shrinking of the cellular body. Preferably the shrinking of the cellular body is so carried out as to at least double the specific gravity of the original cellular body and preferably care should be taken so that the contracting of the cellular body is carried out sufficiently so as to result in a final product which shrinks to a tension-free condition.

If the cellular body is blown up according to the old processes by the use of nitrogen, the heat treatment causes a portion of the nitrogen contained in the cells of the cellular body to diffuse out of said body. The time of such diffusion-out depends upon the thickness of the body as well as on the temperature and the time.

The use of a light, quick-diffusing gas along with nitrogen, which is a heavy, slow-diffusing gas, in the blowing up of the original cellular body facilitates the removal of the gas from the cellular body. This is particularly so with the use of hydrogen or a mixture of hydrogen and nitrogen. The speed of diffusion of hydrogen is much greater than that of other gases such as nitrogen and therefore the desired contraction of the cellular body can be carried out much faster if such light, quick-diffusing gas is used in the preparation of the original cellular body. It is of course possible to prepare the original cellular body by highly blowing up the same and correspondingly, such cellular body can be very greatly contracted in proportion to the original volume thereof.

Furthermore, it is possible to first prepare the cellular body in the customary manner with nitrogen and then to treat such body with a light, quick-diffusing gas or vapor such as steam or carbon-dioxide or a mixture of gases such as vapor with air or with hydrogen. This causes a diffusion-in of these gases or vapors or mixtures of gases from the surrounding atmosphere into the inner cells thereby expanding the cellular body. The diffusion-in of the gas is carried out in an atmosphere of the particular gas used, either at room temperature or at higher temperatures. The raising of the temperature is always necessary in the case of a thermoplastic cellular body which does not contain any plasticizer or softening agent. Such diffusion-in of gas or vapor has the property of making the cell wall permeable to the nitrogen which is contained therein, and thereby facilitating the later removal of the nitrogen from the cells. In the event that a vapor such as steam is used, it is possible by cooling to condense this vapor and cause it to disappear thereby causing an immediate shrinking of the cell walls. It is possible by this manner to quickly remove a large portion of the nitrogen gas and thereby remove the resistance of the cell walls to shrinking. By this sort of process the cellular body takes on a more or less highly tensioned condition which is removed by the diffusion-out of the gas and/or steam from the cells. By carrying out the diffusion-in of the gas or vapor in the cold state, it is necessary to warm the cellular body in order to cause the cell walls to shrink and lose the tension which has been created by the diffusion-out of the gases and/or vapor contained in the cellular body. By carrying out the diffusion-in of the light gas at warm temperatures, the shrinking of the cellular body occurs simultaneously with the diffusion-out of the gases and/or vapor.

To facilitate diffusion-out of the gases from the cut pieces of thermoplastic cellular body, it is preferable to carry out the heating of the cellular body under reduced pressure and preferably under vacuum conditions. By the choice of the gas and/or vapor, or the mixture of gases, and by the application of various temperatures and by the shortening of the time of heating, various effects can be produced and stronger or weaker shrinking of the cellular body can be accomplished. It is therefore possible by a short treatment at relatively low temperatures to cause the light, quick-diffusing gas along with the nitrogen to escape from the cellular body. For example at temperatures of about 70° C., the gas diffuses out of the body very quickly. For example, by short treatment with a light, quick-diffusing gas and using slices of from 20 to 30 mm. thickness, the desired shrinking and creating of a tension-free body takes place in a very short period of time, such body having a very fine velvet-like surface.

By the process of the present invention, flat, sheet-like forms such as bands or foils may be prepared in a thickness of 0.5 to 10 mm., preferably 2 to 5 mm. which have completely distinct properties which are caused by the diffusion-out of the gas and by the shrinking together of the body, thereby resulting in a smaller volume of the thermoplastic body and in a corresponding reduction in size of the size of the cells.

A characteristic of the final product resulting from the contracting of the cellular body, is the number of cells in the cut surface of the cellular body per cm.² thereof in relationship to the specific gravity thereof. In fact, the contracted cellular body has a definite number of cells per cm.² through the cut surface thereof for a given specific gravity. To determine the number of cells in such cut surface, the surface of the body was examined under magnifying power of about 30 times. The uncut cells are not included in determining this number. The number of cells is given as an average value for a cross-section of the entire structure. Cellular bodies with a known number of cells depending upon the specific gravity of the body could not hitherto be prepared from artificial thermoplastic substances and are in fact not known until the present invention.

The following examples are given as illustrative of preferred embodiments of the present invention, the scope of said invention not however being limited thereto.

*Example I*

A closed cell, gas-containing cellular body is prepared according to known processes with 650 g. polyvinylchloride and 350 g. dioctylphthalate, to which is added 150 g. methylethylketone, and 20 g. of lead stearate as stabilizer (and a dye if desired). A cellular body is formed from this mixture by a gas mixture consisting of 90% hydrogen and 10% nitrogen. The addition of gas is so regulated that the resulting cellular body after expansion has a specific gravity of 0.10 to 0.12. This original cellular body is then cut into slices about 10 mm. thick. These slices are allowed to stand at room temperature for about 24 hours in the air so that not only is the solvent allowed to escape but a great portion of the hydrogen also escapes.

These cut pieces are very limp and have a very unattractive surface without, however, having any appreciable change in volume. This mass is then heated at temperatures from 100–125° C., thereby causing the body to contract quickly. Any hydrogen which may still remain in the cells will thus escape, and the cut piece after about 1–4 hours and after cooling has a specific gravity of about 0.5 and moreover has a very smooth surface. The surface has about 1000 cut cells per cm.² thereon. Such final product is useful for the making of shoe soles.

*Example II*

A cellular body is prepared from 500 g. polyvinyl chloride, 500 g. dibutylphthalate, 100 g. acetic ester, 10 g. of titanium dioxide, additional dye as desired, and 15 g. lead stearate as stabilizer, by the use of nitrogen gas for the formation of the cells. The addition of the gas is so controlled that after expansion, the resulting cellular body has a specific gravity of 0.05.

This original cellular body is cut into slices about 2–3 mm. thick and these are heated at a temperature of 100° C. for 1–2 hours. The cellular body shrinks about 40% and the resulting cellular body has a specific gravity of about 0.25 and has about 1000 cut cells per cm.² in the surface thereof. The thus prepared sheet structure is very soft, elastic and stable, and has a very nice velvet-like surface.

*Example III*

Hard flat sheet-like structures having an especially fine cellular structure and a specific gravity of about 0.15 to 0.25, which may be used as insulating material for cooling plants may be prepared as follows:

A plasticizer-free cellular body is prepared having a specific gravity of 0.04, by the application of a solvent. The cells are formed by a gas mixture containing two-thirds hydrogen and one-third nitrogen. This original cellular body is cut into sheets having a thickness of about 10–30 mm. and allowed to stand. After 1–2 days the major portion of the gas diffuses out of the cells, as does the solvent used in making the cellular body. These sheets are then heated at temperatures of about 70–100° C., so as to cause the cellular body to shrink and thereby increase the specific gravity thereof to the desired specific gravity. If necessary the bodies are straightened out between two steel plates and thereby cooled.

While the invention has been illustrated and described as embodied in a process of producing a cellular thermoplastic body having closed cells, it is not intended to be limited to the details shown, since various modifications may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body into thin slices of the same; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

2. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body into thin slices of the same; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells; cooling and subjecting said cellular body having a decreased gas content in the closed cells thereof to atmospheric pressure, said atmospheric pressure being applied before said cellular body is cooled below the heat distortion temperature thereof so as to cause said cellular body to contract evenly, thus forming a dimensionally stable closed-cell, cellular body having the specific gravity thereof increased in comparison with the specific gravity of the original cellular body.

3. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body into thin slices of the same of less than 30 mm. thickness; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

4. A process of dimensionally stabilizing and increasing the specific gravity of expanded, gas-containing, closed-cell, cellular bodies of natural and synthetic elastomers and thermoplastic resins, comprising the steps of slicing a completely expanded, closed-cell, gas-containing cellular body into thin slices of the same of 2–20 mm. thickness; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

5. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body containing at least one light, quick-diffusing gas in the closed cells thereof into thin slices of the same; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

6. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body of polyvinyl chloride into thin slices of the same; heating said thin slices to a temperature between 90–140° C. until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

7. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body of polyvinyl chloride into thin slices of the same; heating said thin slices to a temperature between 100–110° C. until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

8. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body having a specific gravity between 0.03–0.15 into thin slices of the same; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body to a specific gravity of about 0.2–0.9.

References Cited in the file of this patent

UNITED STATES PATENTS

| Number | Name | Date |
| --- | --- | --- |
| 2,383,110 | Cooper | Aug. 21, 1945 |
| 2,384,611 | Southett | Sept. 11, 1945 |
| 2,420,815 | Cooper et al. | May 20, 1947 |
| 2,525,966 | Smith et al. | Oct. 17, 1950 |
| 2,576,911 | Amos | Dec. 4, 1951 |
| 2,589,537 | Carpentier | Mar. 18, 1952 |
| 2,590,156 | Carpentier | Mar. 25, 1952 |